United States Patent [19]
Wallace

[11] Patent Number: 4,807,495
[45] Date of Patent: Feb. 28, 1989

[54] TEMPERATURE-DEPENDENT INFINITELY VARIABLE RATIO TRANSMISSION CONTROL SYSTEM AND METHOD

[75] Inventor: David A. Wallace, Walla Walla, Wash.

[73] Assignee: General Electronic Company, Pittsfield, Mass.

[21] Appl. No.: 197,735

[22] Filed: May 23, 1988

[51] Int. Cl.⁴ .............................................. B60K 41/14
[52] U.S. Cl. ......................................... 74/844; 74/866
[58] Field of Search ................................. 74/844, 866

[56] References Cited

U.S. PATENT DOCUMENTS

| | | | |
|---|---|---|---|
| 1,838,408 | 12/1931 | King et al. | 123/334 |
| 2,230,777 | 2/1941 | Hey | 74/844 X |
| 2,981,122 | 4/1961 | Kelley | 74/844 X |
| 3,015,326 | 1/1962 | Wirsching et al. | 123/140 |
| 3,090,195 | 5/1963 | Fischer et al. | 60/12 |
| 3,895,541 | 7/1975 | Nohira et al. | 74/844 |
| 3,946,705 | 3/1976 | Magnuson et al. | 123/41.13 |
| 4,029,074 | 6/1977 | Sliger | 123/198 D |
| 4,165,008 | 1/1965 | Förster | 74/844 X |
| 4,531,432 | 7/1985 | Inagaki et al. | 74/866 |
| 4,566,354 | 1/1986 | Kumura et al. | 74/866 |
| 4,572,029 | 2/1986 | Kinugasa et al. | 74/866 |
| 4,615,316 | 10/1986 | Yasuhara | 123/333 |
| 4,713,987 | 12/1987 | Matsumura | 74/866 |

FOREIGN PATENT DOCUMENTS

| | | | |
|---|---|---|---|
| 0203255 | 11/1983 | Japan | 74/844 |
| 0081561 | 5/1985 | Japan | 74/844 |

*Primary Examiner*—Dirk Wright
*Assistant Examiner*—William Gehris
*Attorney, Agent, or Firm*—Bailin L. Kuch; Robert A. Cahill

[57] ABSTRACT

To prevent overheating of the power system in a vehicle, a control system operates to dynamically adjust the transmission ratio in response to operating temperature so as to establish the degree of engine speed schedule suppression for any given operator speed command requisite to providing maximum possible vehicle performance while maintaining the operating temperature below an unsafe level.

15 Claims, 2 Drawing Sheets

TEMPERATURE-DEPENDENT INFINITELY VARIABLE RATIO TRANSMISSION CONTROL SYSTEM AND METHOD

The present invention relates to systems for controlling vehicle performance and particularly to a transmission control system for optimizing the speed performance of vehicles consistent with the ability of the vehicle cooling system to maintain safe operating temperatures.

BACKGROUND OF THE INVENTION

It is currently common practice in military track-laying vehicles to arbitrarily suppress operator commanded engine speeds at low transmission ratios where heavy load operating conditions are likely to occur. This is done to prevent the higher levels of heat rejected by the heavily loaded vehicle power system (internal combustion engine and transmission) from exceeding the capacity of the cooling system to adequately dissipate the heat and thus maintain safe operating temperatures. By suppressing commanded engine speed, engine power is reduced, thereby limiting the heat rejected by the power system to safe levels within the capacity of the cooling system to dissipate.

It will be appreciated that the degree of arbitrary suppression of commanded speed must be predicated on the worst possible operating conditions, which of course don't always exist. Thus, vehicle performance is often prejudiced when it is unnecessary to do so. For example, in cold weather, cooling capacity is enhanced to the point where engine speed commands could be executed to the fullest or at least to a greater extent than the arbitrary set degree of suppression without overheating the power system. Also, the vehicle power system load may be less than that anticipated in establishing the arbitrary degree of command suppression. It will be appreciated that it would be highly desirable to continuously afford military vehicles the most optimum operating performance possible, consistent with the capability of the cooling system to maintain the operating temperatures of the power system within safe limits.

It is accordingly an object of the present invention to provide an improved engine speed control system.

A further object is to provide a control system of the above-character, wherein optimum vehicle performance is achieved consistent with the maintenance of safe operating conditions.

Another object is to provide a control system of the above-character, wherein engine speed commands are suppressed only when cooling system capacity is exceeded.

An additional object is to provide a control system of the above-character, wherein engine speed commands are modified in varying degrees of suppression to bring the heat rejected by the power system to a safe level sustainable by the cooling system.

Yet another object is to provide a control system of the above-character, wherein the degree of speed command suppression is adjustable up or down in accordance with power system rejected heat so as to afford the most optimum vehicle performance possible under any given operating conditions.

Other objects of the invention will in part be obvious and in part appear hereinafter.

SUMMARY OF THE INVENTION

In accordance with the present invention, there is provided both a system and a method for controlling the performance of a vehicle equipped with a power system including an internal combustion engine driving an infinitely variable ratio transmission. This control system includes an operator controlled throttle for applying engine speed commands to the engine. In response to sensed engine speed, a transmission controller continuously adjusts the ratio of the transmission so as to dynamically control engine loading in a manner to maintain the engine speed schedule commanded by the operator. The controller also responds to a temperature sensor continuously monitoring the heat rejected by the power system. When the rejected heat reaches an unsafe level, the controller acts to suppress speed commands by increasing the transmission ratio, thereby increasing engine loading. The engine is thus forced to reduce speed in the face of this increased load. The transmission controller then adjusts the transmission ratio to hold this reduced engine speed schedule even though the operator command remains unchanged. Engine power, which is proportional to engine speed, is thus reduced for any given engine speed command, as is the amount of heat rejected by the engine and transmission.

The temperature sensor continues to monitor heat rejection and imposes further engine speed schedule reductions and transmission ratio adjustments, if the power system continues to overheat. On the other hand, if the power system cools down sufficiently, the temperature sensor conditions the controller to reduce transmission ratio and thus reduce engine loading. Engine speed automatically increases, and the controller adjusts the transmission ratio to hold the increased speed schedule. Thus, the vehicle performance that had been sacrificed to hold rejected heat below an unsafe level is at least partially restored toward optimum.

The invention accordingly comprises the features of constructions, arrangements of parts, and combinations of elements, all of which will be exemplified in the description hereinafter set forth, and the scope of the invention will be indicated in the claims.

For a better understanding of the nature and objects of the invention, reference may be had to the following detailed description taken in conjunction with the accompanying drawings, in which FIG. 1 is a schematic block diagram of a system constructed in accordance with the invention for adjustably controlling an infinitely variable ratio transmission of a track-laying vehicle in response to power system temperature;

DETAILED DESCRIPTION

Figure 1:
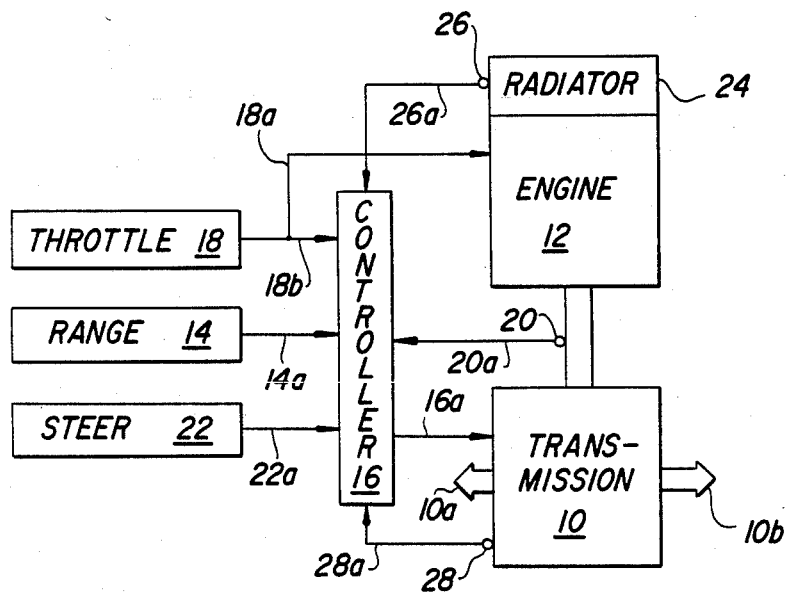

The control system of the present invention, seen in FIG. 1, is utilized to control an infinitely variable ratio transmission 10 driven by an internal combustion engine 12 to develop left and right outputs 10a and 10b for propelling a track-laying vehicle. Transmission 10 may be a hydromechanical transmission of the type disclosed in Reed U.S. Pat. Nos. 4,345,488 and 4,485,691. Transmission 10 thus includes hydraulic components to provide continuously variable hydrostatic drive ratios and mechanical components whose operations are selectively controlled by clutches and brakes to cause the transmission to operate in a plurality of distinct hydrostatic and hydromechanical ranges. To effect range shifting, the operator positions a range selector 14 which is connected to a transmission controller 16 via link 14a, which, in turn, is connected to transmission 10 via link 16a to condition the various brakes and clutches appropriate to operating the transmission in the desired propulsion range. Vehicle speed within each range is controlled by operator manipulation of a throttle 18. These speed commands are communicated to engine 12 via link 18a to adjust fuel rate (throttle valve opening angle or fuel pump rate) and thus call for a desired engine speed schedule. The actual engine speed, monitored by a sensor 20, is communicated to transmission controller 16 via link 20a, which responds by adjusting the transmission ratio (transmission output speed/engine speed) and thus engine loading to hold the engine speed to the value scheduled for a given speed command. Such ratio adjustments are accomplished in conventional fashion by adjusting the displacements of the infinitely or continuously variable drive ratio hydraulic components. To steer the vehicle, the operator manipulates a steering wheel 22 which is connected to controller 16 by link 22a. The controller transfers steering commands to transmission 10 via link 16a, which are effected by appropriately adjusting hydraulic displacements such as to change the speeds of the right and left transmission outputs by equal and opposite amounts. The resulting speed differential alters vehicle course in typical skid-steer fashion.

A known transmission controller, such as generally described above, is equipped with a plurality of engine speed scheduling cams (not shown) which are normally individually selected on the basis of which range the transmission is operating in. The selected cam is variously angularly positioned via link 18b in conjunction with the speed commands issued by throttle 18 to engine 12 via link 18a. The cams are appropriately contoured to control a ratioing mechanism (not shown) operating via link 16a to adjust the ratio of transmission 10 such as to create the requisite loading of engine 10 to maintain a predetermined engine speed schedule for a given operator speed command. Thus, as the speed commands to the engine are varied, the appropriate cam operates to vary the transmission ratio and thus engine speed in accordance with the predetermined schedule designed into its contour. It will be appreciated that these engine speed scheduling cams are designed to provide optimum vehicle performance consistent with maximizing fuel economy, particularly when operating at the higher transmission ratios. At low transmission ratios, i.e., first range operation or at least the lower portion thereof, where heavy operating load conditions are likely to occur, it is typically found necessary to suppress engine speed commands in order to prevent the heat rejected by the vehicle power system (engine and transmission) from exceeding safe limits. To effect such suppression, low ratio engine speed scheduling cam is designed to arbitrarily schedule a reduced or suppressed engine speed for every operator speed command. Thus, at the sacrifice of vehicle performance, engine power is reduced to hold rejected heat to safe levels within the capacity of the cooling system to dissipate.

Figure 3:
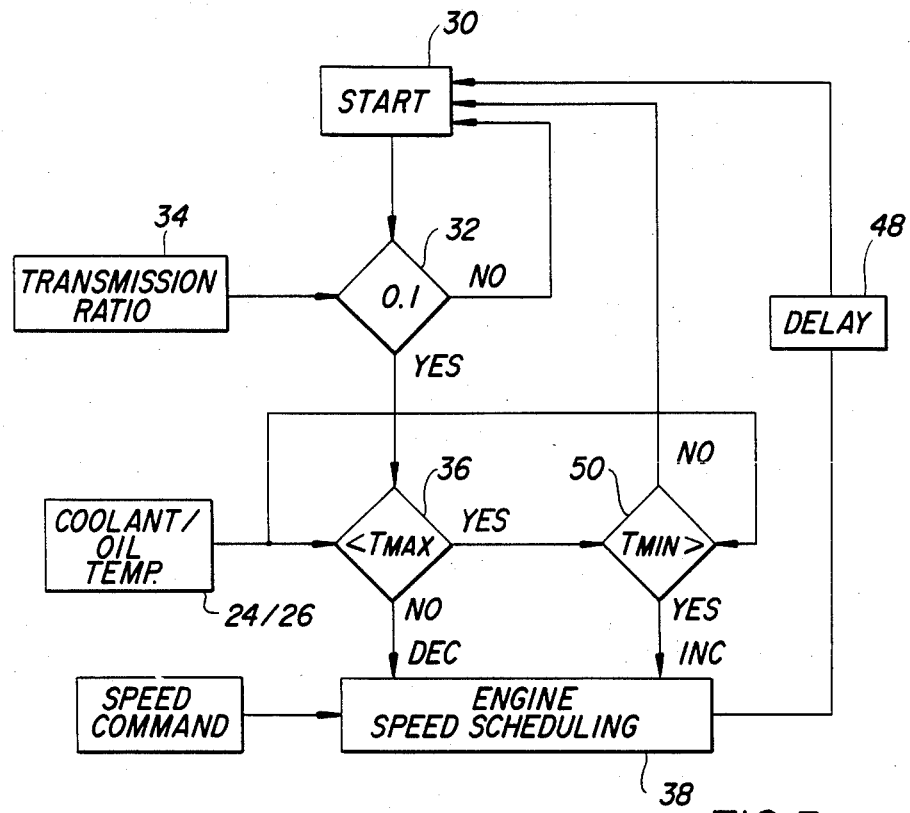
FIG. 3 is a flow chart illustrating the temperature-dependent operation of the control system of FIG. 1 when implemented with an electronic transmission controller.

In accordance with the present invention, transmission controller 16 is made responsive to the heat rejected by the power system such that engine speed commands are suppressed only when the rejected heat reaches an unsafe level and then only to the degree necessary to prevent overheating of the power system. To this end, the cooling system radiator 24 is equipped with a sensor 26 which provides signals indicative of coolant temperature over lead 26a to controller 16. Alternatively, a sensor 28 provides signals indicative of transmission oil temperature to the controller over lead 28a. The flow diagram of FIG. 3 illustrates a programmed electronic implementation of the invention as undertaken by transmission controller 16. From program start 30, logic circuitry 32 is repetitively signalled to sample the ratio at which transmission 10 is operating, as indicated from ratio monitor 34. If the transmission ratio is equal to or greater than a predetermined low ratio value, e.g. 0.1, a NO output conditions start 30 to restart the program, and the transmission ratio is again sampled by logic circuitry 32. If the transmission ratio is found to be less than 0.1, a YES output from logic circuitry 32 signals logic circuitry 36 to compare the coolant temperature monitored by sensor 24 or alternatively transmission oil temperature monitored by sensor 26 against a predetermined maximum temperature threshold Tmax. If the sensed temperature is found to be equal to or greater than Tmax, indicating that an unsafe level of rejected heat has been reached, a NO output is transmitted to an engine speed scheduling unit 38.

Figure 2:
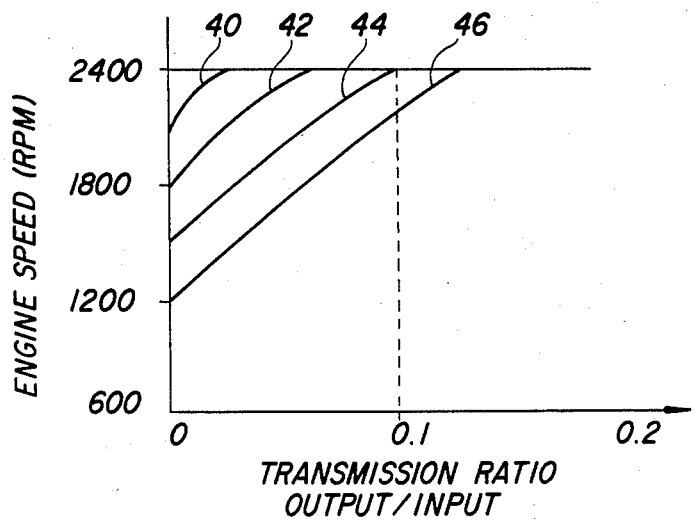
FIG. 2 is a graph illustrating the operation of the control FIG. 1.

Referring to FIG. 2, unit 38 is capable of establishing any one of a family of engine speed schedules illustrated as curves showing engine speed as a function of transmission ratio, several representative curves being indicated at 40, 42, 44 and 46. It is seen that curve 40 schedules maximum engine speed for a maximum speed command issued to unit 38 while the transmission ratio is less than 0.1. The transmission controller continuously adjusts the transmission ratio to hold this maximum engine speed. Thus, maximum low transmission ratio vehicle performance is achieved with engine speed schedule 40. If the vehicle is operating in accordance with schedule 40 under a maximum speed command when logic circuitry 36 issues a NO output signalling an overheating condition, engine speed scheduling unit 38 responds by increasing the transmission ratio until a predetermined incremental reduction in engine speed is achieved. Note that this engine speed reduction is produced by the transmission acting to increase engine load, not by actually modifying the speed command so as to reduce engine fuel rate. The controller then continuously adjusts the transmission ratio to hold this reduced engine speed in response to varying vehicle loads, and the engine speed schedule moves down from curve 40 toward curve 42. The reduced engine speed reduces engine power, as well as the heat rejected by the power system. If, during the next program iteration, the operating temperature is still equal to or in excess of Tmax, unit 38 in controller 16 again invokes another incremental reduction in engine speed, and the engine speed schedules drops further toward curve 42 in FIG. 3. It is thus seen that the engine speed schedule will be repeatedly, incrementally dropped toward curve 42 and below toward curve 44 and possibly even to curve 46 in a dynamic effort to hold heat rejection to a temperature below Tmax. With each drop, vehicle performance is sacrificed to prevent the power system from overheating under sustained low transmission ratio, heavy load conditions. With each drop in engine schedule, unit 38 signals start 30 after an appropriate pause imposed by delay 48, to execute another program iteration. This delay allows each drop to take its effect before the operating temperature is again compared against Tmax, thereby inhibiting overreaction by engine speed scheduling unit 38.

At some point, an engine speed schedule is established where scheduled engine speed has been suppressed to the point that the operating temperature has fallen below Tmax. Logic circuitry 36 then issues a YES output signalling logic circuitry 50 to compare the sensed operating temperature against a minimum temperature threshold Tmin which may, for example, be set at 5° F. less than Tmax. If the operating temperature is not equal to or less than Tmin, a NO output signals start 30 to initiate another program iteration. However, if logic circuitry 50 determines that the operating temperature is equal to or less than Tmin, a YES output signals engine speed scheduling unit 38 to incrementally raise a suppressed engine speed schedule to the next higher level. Transmission controller achieves this by reducing the ratio of transmission 10, thus reducing engine load. Engine 12 thus speeds up, and, when a predetermined increase in engine speed is achieved, controller 16 continuously adjusts the transmission ratio to hold this increased speed. With each incremental increase of engine speed, start 30 is signalled after the pause imposed by delay 48 to initiate another program iteration.

It is thus seen that the engine speed schedule established for any given engine speed command is adaptively incremented upwardly and downwardly depending on the sensed power system temperature, (coolant or transmission oil temperature) such as to regulate rejected heat to a safe level that the cooling system can readily maintain. Thus maximum possible, safe vehicle performance is always assured. This is in contrast to the prior art approach of arbitrarily establishing a fixed, suppressed engine speed schedule, such as curve 44, to govern vehicle performance at low transmission ratios regardless of operating temperatures. It is seen that this approach often times unnecessarily sacrifices vehicle performance.

Figure 4:
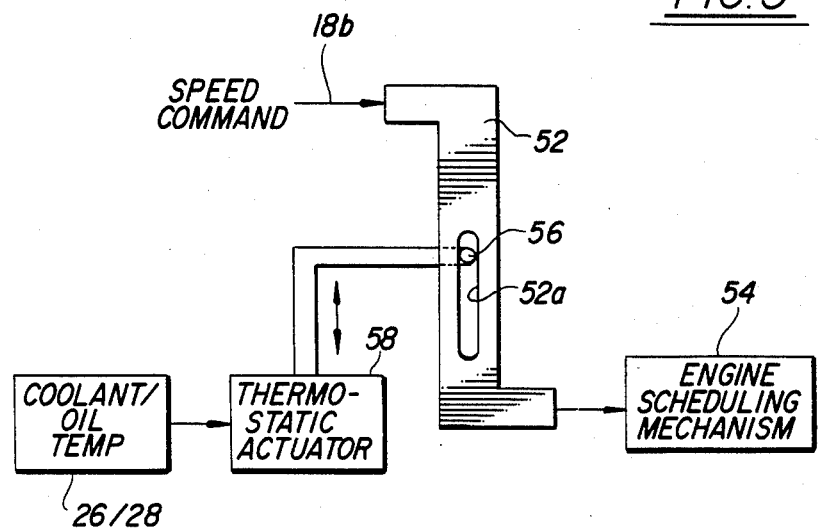
FIG. 4 is a fragmentary schematic view illustrating a mechanical implimentation for achieving temperature-dependent operation of the control system of FIG. 1.

As an alternative to the above described electronic implementation of an operating temperature dependent engine speed scheduling control system, the mechanical implementation illustrated in FIG. 4 can be utilized. Thus, operator speed commands issued by throttle 18 in FIG. 1 are applied via link 18b to one end of a lever 52 included in transmission controller 16. The other end of this lever is linked to mechanically control an engine scheduling mechanism 54. Lever 52 pivots about a pin 56 disposed in an elongated slot 52a formed in the lever intermediate its ends. The vertical position of pin 56 in this slot is varied by a thermostatic actuator 58 acting in response to either coolant temperature sensor 26 or transmission oil temperature sensor 28. As long as the operating temperature remains below the unsafe level, e.g., Tmax, actuator 58 positions pin 56 at the midpoint between the lever ends, the throws of the lever ends in response to a speed command are equal. Thus engine speed scheduling mechanism 54 is mechanically conditioned to adjust the ratio of transmission 10 in a manner to hold engine speed to the maximum called for by the speed command. As operating temperature increases, actuator pulls pivot pin 56 downward, thereby suppressing the operator speed command as applied to mechanism 54. In response, transmission controller 16 increases transformer ratio and thus engine loading to reduce engine speed, power and rejected heat. Transmission ratio then continuously adjusts to hold this suppressed or reduced engine speed, and the engine speed schedule drops down from curve 40 toward curve 42 in FIG. 2, as described above. This operation of suppressing engine speed commands in response to rising operating temperature progresses until heat rejection is reduced to a level sustainable by the cooling system. Obviously, with falling operating temperatures, actuator 58 pushes pivot pin upwardly to progressively reduce the degree engine speed command suppression. Thus, the control system continuously seeks the maximum speed at which the engine can safely operate without overheating the power system. The operator is therefore always availed of the maximum vehicle performance safely permissible under prevailing vehicle load conditions.

While the present invention has been described with particular concern to preventing overheating during low transmission ratio operation, less than 0.1 in the embodiment of FIG. 3, it will be appreciated that temperature dependent engine speed scheduling in accordance with the present invention could be applied regardless of transmission ratio, simply by eliminating the step performed by logic circuitry 32. Moreover, it will be appreciated that the present invention is applicable to various types of infinitely variable ratio transmissions, skid-steering or not, employed in industrial as well as military vehicles of either the track-laying or wheeled variety.

It is thus seen that the objects set forth above, including those made apparent from the foregoing description, are efficiently attained, and since certain changes may be made in the disclosed construction without departing from the present invention, it is intended that all matters disclosed herein be taken as illustrative and not in a limiting sense.

Having described the invention, what is claimed and desired to secure by Letters Patent is:

1. A control system for a vehicle equipped with a drive system including an internal combustion engine driving an infinitely variable ratio transmission, said control system comprising, in combination:
   A. a manually operated throttle for generating engine speed commands to the engine;
   B. a first sensor for generating a signal indicative of engine speed;
   C. a transmission controller operatively linked with the transmission, said transmission controller adjusting the transmission ratio in response to said engine speed commands and said engine speed signal to maintain an engine speed schedule corresponding to a given engine speed command;
   D. a temperature sensor monitoring the heat rejected by the drive system, said controller operating in response to said temperature sensor to produce a decrease in engine speed by increasing the transmission ratio when the heat rejected by said drive system reaches an unsafe level and then adjust the transmission ratio to maintain the decrease engine speed as a new engine speed schedule for said given engine speed command.

2. The control system defined in claim 1, wherein said transmission controller includes linkage means mechanically responsive to said engine speed commands, said temperature sensor mechanically acting on said linkage means to alter the mechanical response thereof to said engine speed commands in accordance rejected heat temperature, thereby establishing new engine speed schedules for a given engine speed command in response to variations in rejected heat temperature.

3. The control system defined in claim 2, wherein said linkage means includes a lever and a pin pivotally mounting said lever intermediate first and second opposed ends thereof, said first end connected to receive said engine speed command and said second end connected to apply said engine speed commands to transmission ratio adjusting means, said temperature sensor acting to vary the position of said pin in response to rejected heat temperature.

4. The control system defined in claim 1, wherein said controller includes means for establishing a maximum engine speed schedule and any one of a plurality of new, reduced engine speed schedules for any given engine speed command in response to rejected heat temperature.

5. The control system defined in claim 4, wherein said establishing means operates in response to rejected heat temperature to adaptively establish the one of said reduced engine speed schedules providing optimum vehicle speed performance consistent with limiting the heat rejected by the power system below said unsafe level.

6. The control system defined in claim 5, wherein said establishing means initially establishes said maximum engine speed schedule for any given engine speed command and operates in response to repeated samplings of rejected heat temperature to establish a new, incrementally reduced engine speed schedule each time the rejected heat temperature is found to be at said unsafe level.

7. The control system defined in claim 1, wherein said transmission controller includes first means for comparing the rejected heat temperature sensed by said temperature sensor against a predetermined maximum temperature threshold, and second means responsive to said first means when the sensed temperature reaches the maximum temperature threshold for establishing in lieu of the existing engine speed schedule an incrementally reduced engine speed schedule for a given engine speed command.

8. The control system defined in claim 7, which further includes third means responsive to said first means when the sensed temperature is less than the maximum temperature threshold for comparing the sensed temperature against a predetermined minimum temperature threshold, said second means responsive to said third means when the sensed temperature is less than said predetermined minimum temperature for establishing in lieu of the existing engine speed schedule an incrementally increased engine speed schedule for a given engine speed command.

9. The control system defined in claim 7, wherein said first means compares the sensed temperature against the maximum temperature threshold repetitively, and said second means establishing an incrementally reduced engine speed schedule each time the sensed temperature is found to be at the maximum temperature threshold.

10. The control system defined in claim 8, wherein said first means repetitively compares the sensed temperature against the maximum temperature threshold, said third means repetitively compares the sensed temperature against the minimum temperature threshold as long as the sensed temperature is less than the maximum temperature threshold, and said second means establishing an incrementally reduced engine speed schedule each time the sensed temperature is found to be at the maximum temperature threshold and an incrementally increased engine speed schedule each time the sensed temperature is found to be less than the minimum temperature threshold.

11. The control system defined in claim 7, wherein said controller further includes fourth means for inhibiting said second means when the existing transmission ratio exceeds a predetermined minimum ratio.

12. The control system defined in claim 8, wherein said controller further includes fourth means for inhibiting said second means when the existing transmission ratio exceeds a predetermined minimum ratio.

13. A method for controlling the speed of an internal combustion engine driving an infinitely variable ratio transmission in a vehicle drive system, said method comprising the steps of:
   A. generating engine speed commands to the engine;
   B. sensing the speed of the engine in response to engine speed commands.
   C. monitoring a temperature indicative of the heat rejected by the vehicle drive system;
   D. adjusting the transmission ratio in response to the engine speed commands and the sensed engine speed to maintain the engine speed normally scheduled for any given engine speed command;
   E. responding to the rejected heat temperature reaching an unsafe level by increasing the transmission ratio to produce a reduction in engine speed; and
   F. readjusting the transmission ratio to maintain the reduced engine speed to the new engine speed scheduled for any given engine speed command.

14. The method defined in claim 13, wherein said temperature responding step includes repeatedly comparing the rejected heat temperature against a predetermined maximum temperature and further increasing the transmission ratio to produce a further reduction in engine speed each time the rejected heat temperature reaches the maximum temperature, and said readjusting step includes adjusting the transmission ratio to maintain the engine speed resulting from each reduction as the new engine speed scheduled for any given engine speed command.

15. The method defined in claim 14, wherein said temperature responding step further includes comparing the rejected heat temperature against a predetermined minimum temperature each time the rejected heat temperature is less than the maximum temperature and decreasing the transmission ratio to produce an increase in engine speed each time the rejected heat temperature is less than the minimum temperature, and said readjusting step includes adjusting the transmission ratio to maintain the engine speed resulting from each increase as the new engine speed scheduled for any given engine speed command.

* * * * *

UNITED STATES PATENT AND TRADEMARK OFFICE
CERTIFICATE OF CORRECTION

PATENT NO. : 4,807,495

DATED : February 28, 1989

INVENTOR(S) : David A. Wallace

It is certified that error appears in the above-identified patent and that said Letters Patent is hereby corrected as shown below:

On the Title Page, Item [73], should read -- General Electric Company, Pittsfield, Mass. --.

Signed and Sealed this

Fifteenth Day of August, 1989

Attest:

DONALD J. QUIGG

Attesting Officer

Commissioner of Patents and Trademarks